Dec. 1, 1942.         J. T. RANNEY         2,303,495
RUNG OR DOWEL FASTENER
Filed Dec. 14, 1940
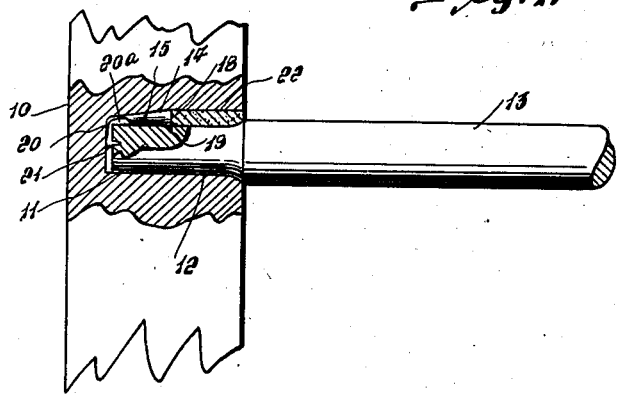
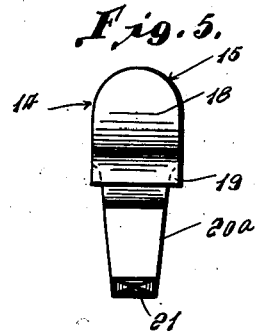
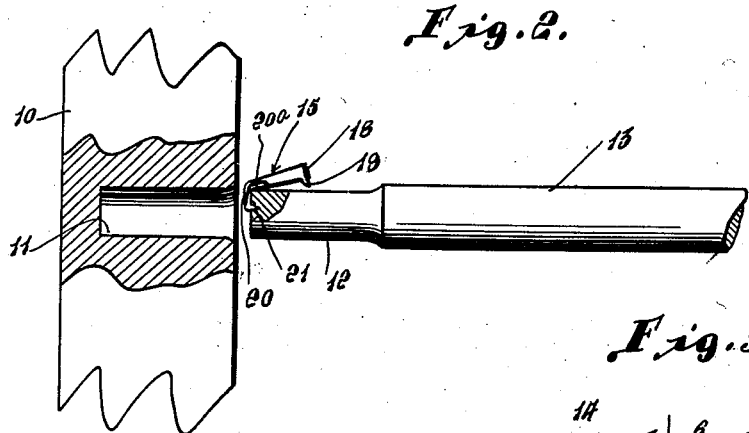
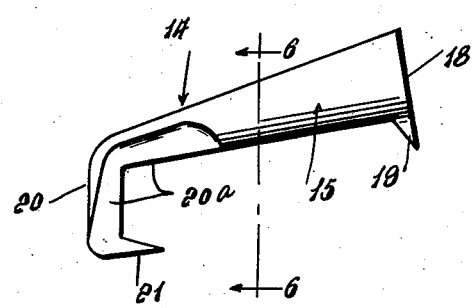
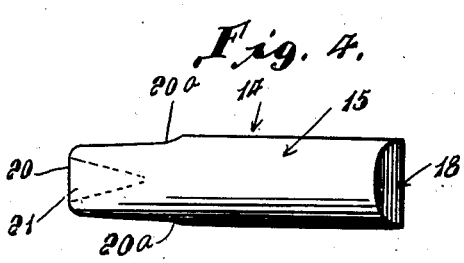
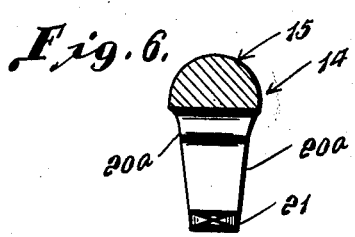
Inventor
J. T. Ranney
By T. T. Bryant
Attorney.

Patented Dec. 1, 1942

2,303,495

UNITED STATES PATENT OFFICE 2,303,495

RUNG OR DOWEL FASTENER

John T. Ranney, Presque Isle, Maine

Application December 14, 1940, Serial No. 370,217

8 Claims. (Cl. 20—92)

This invention relates to certain new and useful improvements in rung or dowel fasteners.

The primary object of the invention is to provide a rung or dowel fastener that may be used for new or repair woodwork, such as anchoring the ends of rungs in the sockets of chair legs or the side rails of ladders or similar devices and in which the fastener securely anchors the rung in the socketed member to which the rung is attached.

A further object of the invention is to provide a rung or dowel fastener of extremely simple construction and in the form of a hooked pin, tack or nail that is attached to the end of a rung prior to insertion thereof in a socket with the hooked member having a portion overlying the side of the end of the rung, with a spur carried by the end of the fastener for bighting engagement in the rung when the latter is driven into a socket with the laterally disposed portion of the fastener wedgingly engaging the wall of the socket to produce an effective binding engagement between the rung end and socket wall for retaining the rung in the socket.

With the above and other objects in view that will become apparent as the nature of the invention is better understood, the same consists in general of certain novel details of construction and combination of parts hereinafter more fully described, illustrated in the accompanying drawing and claimed.

In the drawing:

Figure 1 is a fragmentary side elevational view of a chair leg and rung with the socketed connection between the rung and leg shown in section to illustrate the fastener element for anchoring the rung in the leg.

Figure 2 is a fragmentary side elevational view, similar to Figure 1, partly in section prior to insertion of the rung in the leg socket and showing the fastener element carried by the end of the rung, Figure 3 is a side elevational view of the fastener element showing spurs at opposite ends respectively for engagement with the outer terminal end and side of a chair rung, Figure 4 is a top plan view of the fastener element, Figure 5 is an end elevational view of the fastener element, and Figure 6 is a cross sectional view taken on line 6—6 of Figure 3.

While the rung or dowel fastener may be employed for anchoring a rung in the socket of an associated member, such as found in chairs, ladders or other articles of furniture, the invention, for purposes of clarity, will be described as a chair construction, while the fastener member that may comprise a pin, nail or the like will also be referred to as an anchoring pin. Accordingly, in the accompanying drawing showing the preferred embodiment of the invention, the reference character 10 designates a chair leg having a side opening rung socket 11 therein for the reception of the reduced end 12 of the rung 13. The diameters of the rung socket 11 and the end 12 of the rung are relatively proportioned so that the rung may be driven into the socket with a minimum of force, the anchoring pin designated in general by the reference character 14 being employed for rigidly anchoring the rung in the socket against displacement of the rung in the presence of heavy duty service.

The anchoring pin 14 as shown in detail in Figures 3 to 6 comprises a tapering shank 15 of substantially semi-circular formation in cross-section as shown in Figure 6 with a flat bottom face and an arcuate upper face. The larger end of the tapering shank 15 has a flat terminal substantially transversely extending end wall 18 and a knife-edged spur 19 depends from the larger end of the shank 15, with the outer face of the spur 19 being continuous with the end wall 18 of the shank as shown more clearly in Figure 3. The smaller end of the tapering shank 15 of the anchoring pin is of hook formation and includes a laterally directed arm 20 projecting at an obtuse angle relative to the flat bottom face 16 of the shank with the arm extending laterally of the flat face 16 and carrying at the terminal end thereof a substantially right angularly directed spur 21 underlying the outer smaller end of the shank 15. The opposite sides of the smaller end of the tapering shank 15 and the laterally directed arm 20 are cut-away as at 20ᵃ, reducing the cross-sectional area which permits limited flexibility between the tapering shank and hook formation.

To anchor the rung 13 in the chair leg 10, the anchoring pin 14 has the spur 21 at the hook end 20 thereof driven into the outer terminal end of the reduced end 12 of the rung as shown in Figure 2 with the flat side 16 of the shank overlying the end 12 of the rung with the spur 19 at the larger end 18 of the pin shank 15 resting upon the side of the reduced end 12 of the rung. As the diameter of the reduced end 12 of the rung is substantially the same as the diameter of the socket 11 in the chair leg 10, the rung when driven into the socket causes the shank 15 of the anchoring pin 14 to wedgingly cut a groove 22 in the side wall of the socket 11 and during the placement of the reduced end 12 carrying the anchoring pin in the socket 11 the wall of the socket tends to move the flat side 16 of the tapering shank 15 of the anchoring pin into engagement with the side of the reduced end 12 of the rung with the spur 19 driven by such movement into the end 12 of the rung as shown in Figure 1. The cut-away portions 20ª at the smaller end of the anchoring pin permit a slight bending movement at the point of connection of the arm 20 with the shank 15 so that the spur 21 at the outer end of the arm will remain engaged in the outer end of the reduced end 12 of the rung. With the tapering shank 15 of the anchoring pin, it will be understood that an unusually tight wedging engagement is established between the reduced end 12 of the rung and the wall of the socket 11 jointly with the tight wedging engagement of the upper curved face 17 of the shank 15 with the adjacent wall portion of the socket 11 so that the rung 13 will be rigidly anchored in the chair leg 10 and will retain such rigid mounting even in the presence of unusually heavy service. During the placement of the rung carrying the anchoring pin 14 in the socket 11, the pin, as stated, wedgingly cuts a groove 22 in the wall of the socket 11 and to provide a finished and smooth surface at the open end of the socket 11, said groove is charged with a filler 23 such as putty, plastic wood or any other appropriate material as shown in Figure 1.

From the above detailed description of the invention, it is believed that the construction and operation will at once be apparent, and while there is herein shown and described the preferred embodiment thereof, it is to be understood that minor changes may be made in the details of construction, such as will fall within the scope of the invention as claimed.

I claim:

1. In a rung or dowel fastener, in combination, a leg having a socket therein and a rung having an end of substantially the same diameter as the socket seated in the socket, and an anchoring pin having a shank overlying the side of the seated end of the rung to wedgingly cut into a side wall of the socket, and a laterally directed hook end extending over the seated end of the rung, and a spur at each end of the anchoring pin engaged with the seated end of the run, the pointed ends of both spurs extending in intersecting planes.

2. A rung or dowel fastener as specified in claim 1, wherein the shank of the anchoring pin is of tapering formation with the larger end spaced from the hook end, said anchoring pin wedgingly cutting a groove in the wall of the socket laterally of the seated end of the rung and said groove having a filler placed therein.

3. In a rung or dowel fastener, in combination, a leg having a socket therein and a rung having an end of substantially the same diameter as the socket seated in the socket, and an anchoring pin having a shank overlying the side of the seated end of the rung to wedgingly cut into a side wall of the socket, a laterally directed hook end extending extending over the seated end of the rung, and a spur at each end of the anchoring pin engaged with the seated end of the rung, said anchoring pin being of reduced cross-sectional area at the point of connection between the shank hook end and said hook end extending at an obtuse angle relative to the shank whereby the shank may move relatively to the hook end when placing the rung end in the socket.

4. A rung or dowel fastener as specified in claim 1, wherein the shank of the anchoring pin is of tapering formation with the larger end spaced from the hook end, said anchoring pin wedgingly cutting a groove in the wall of the socket laterally of the seated end of the rung and said groove having a filler placed therein, said anchoring pin being of reduced cross-sectional area at the point of connection between the shank hook end and said hook end extending at an obtuse angle to the shank whereby the shank may move relatively to the hook end when placing the rung end in the socket.

5. In a rung or dowel fastener, an anchoring pin comprising a tapering shank, a laterally directed spur carried by the larger end of the shank, a laterally directed hook arm carried by the smaller end of the shank extending in the same direction as said spur and a spur laterally projecting from the free end of the arm and underlying the shank, the pointed ends of the spurs extending in intersecting planes.

6. In a rung or dowel fastener, an anchoring pin comprising a tapering shank, a laterally directed spur carried by the larger end of the shank, a laterally directed hook arm carried by the smaller end of the shank extending in the same direction as said spur and at an obtuse angle to the longitudinal axis of the shank and a spur laterally projecting from the free end of the arm and underlying the shank, said shank having a flat side adapted for contact with a rung during placement of the rung in a socket.

7. In a rung or dowel fastener, an anchoring pin comprising a tapering shank, a laterally directed spur carried by the larger end of the shank, a laterally directed hook arm carried by the smaller end of the shank extending in the same direction as said spur and a spur laterally projecting from the free end of the arm and underlying the shank, the arm extending at an obtuse angle from said shank and said pin being of reduced cross-sectional area at the point of connection of the arm to the shank whereby the shank may move relatively to the arm during the seating of a chair rung.

8. In a rung or dowel fastener, an anchoring pin comprising a tapering shank, a laterally directed spur carried by the larger end of the shank, a laterally directed hook arm carried by the smaller end of the shank extending in the same direction as said spur and a spur laterally projecting from the free end of the arm and underlying the shank, said shank having a flat side adapted for contact with a rung, the arm extending at an obtuse angle from said shank and said pin being of reduced cross-sectional area at the point of connection of the arm to the shank whereby the shank may move relatively to the arm during the seating of a chair rung.

JOHN T. RANNEY.